US006916443B2

(12) United States Patent
Skoczylas et al.

(10) Patent No.: US 6,916,443 B2
(45) Date of Patent: Jul. 12, 2005

(54) HIGH DIFFERENTIAL PRESSURE ELECTROCHEMICAL CELL

(75) Inventors: Thomas Skoczylas, Meriden, CT (US); Matthew Christopher, Manchester, CT (US); Jason K. Shiepe, Middletown, CT (US); Mark E. Dristy, Manchester, CT (US); Trent M. Molter, Glastonbury, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 0 days.

(21) Appl. No.: 10/604,890

(22) Filed: Aug. 25, 2003

(65) Prior Publication Data

US 2004/0105773 A1 Jun. 3, 2004

Related U.S. Application Data

(62) Division of application No. 09/714,933, filed on Nov. 17, 2000, now Pat. No. 6,666,961.
(60) Provisional application No. 60/166,135, filed on Nov. 18, 1999.

(51) Int. Cl.[7] .............................. B22F 3/00; B22F 1/02
(52) U.S. Cl. ................................ 419/2; 419/27; 419/35
(58) Field of Search ............................. 419/2, 27, 35; 427/125, 126.1, 247

(56) References Cited

U.S. PATENT DOCUMENTS

| | | | | |
|---|---|---|---|---|
| 3,802,878 A | * | 4/1974 | Lindstrom | 419/2 |
| 3,992,271 A | | 11/1976 | Danzig et al. | 204/129 |
| 4,039,409 A | | 8/1977 | LaConti et al. | 204/129 |
| 4,146,438 A | | 3/1979 | de Nora et al. | 204/1.5 |
| 4,206,271 A | * | 6/1980 | Norling et al. | 429/45 |
| 4,209,591 A | | 6/1980 | Hendriks | 435/288 |
| 4,225,346 A | * | 9/1980 | Helliker et al. | 419/2 |
| 4,272,352 A | | 6/1981 | Jizaimaru et al. | 204/279 |
| 4,331,523 A | | 5/1982 | Kawasaki | 204/129 |
| 4,389,297 A | | 6/1983 | Korach | 204/252 |
| 4,447,302 A | * | 5/1984 | Brennecke et al. | 205/630 |
| 4,707,229 A | | 11/1987 | Dempsey et al. | 204/129 |
| 5,110,541 A | * | 5/1992 | Yamamasu et al. | 419/2 |
| 5,346,778 A | | 9/1994 | Ewan et al. | 429/19 |
| 5,640,669 A | * | 6/1997 | Harada et al. | 428/552 |
| 5,837,110 A | | 11/1998 | Dean | 204/240 |
| 5,937,264 A | * | 8/1999 | Wallin | 419/2 |
| 2001/0041281 A1 | | 11/2001 | Wilkinson et al. | 429/34 |
| 2002/0086195 A1 | | 7/2002 | Gorman et al. | 429/26 |

FOREIGN PATENT DOCUMENTS

| | | | | |
|---|---|---|---|---|
| DE | 19757320 A1 | 7/1999 | | H01M/4/92 |
| EP | 0406831 A1 | 1/1991 | | H01M/8/18 |
| EP | 0472922 A2 | 7/1991 | | H01M/8/18 |
| EP | 0791974 A1 | 8/1997 | | H01M/4/86 |
| GB | 1145250 | 3/1969 | | H01M/27/00 |
| WO | WO 99/39840 | 8/1999 | | B05D/5/12 |
| WO | WO 99/39841 | 8/1999 | | B05D/5/12 |
| WO | WO 01/37359 | 5/2001 | | H01M/4/00 |

OTHER PUBLICATIONS

International Search Report, PCT/US00/42223, PCT Filed Nov. 17, 2000. Searched Apr. 22, 2002. 4 pages.
"Prehumidification of Reactants for Flight Weight Hydrogen–Oxygen Fuel Cells." Arnold P. Fickett et al. National Meeting of the American Institute of Chemical Engineers. Detroit, MI. Jun. 3–6, 1973.
"Abstracts of the 1974 Pittsburgh Conference on Analytical Chemistry and Applied Spectroscopy." Cleveland, OH. Mar. 4–8, 1974.
"Hydrogen/Oxygen Fuel Cells with In–Situ Product Water Removal." Andrei Leonida. Hamilton Standard Div. United Technologies Corporation. Windsor Locks, CT. pp. 776–781.
"Status and Applicability of Solid Polymer Electrolyte Technology to Electrolytic Hydrogen and Oxygen Production." W.A. Titterington. General Electric Company, Lynn, MA. NASA: 76N16782. 3 pages.
"Design and Test Status for Life Support Applications of SPE Oxygen Generation Systems." Titterington et al. General Electric Company. New York: American Society of Mechnical Engineers. Apr. 14, 1975.
"An Electrochemically Regenerative Hydrogen–Chlorine Energy Storage System for Electric Utilities." Gileadi et al. *Journal of Power Sources*, 2 (1977/78). Elsevier Sequoia S.A., Lausanne. pp. 191–200.
"Aircraft On–Board Electrochemical Breathing Oxygen Generators." J.W. Harrison. General Electric Company. New York: American Society of Mechanical Engineers. Apr. 15, 1975.
"Status of Solid Polymer Electrolyte Fuel Cell Technology and Potential for Transportation Applications." McElroy et al. General Electric Company. IECEC 1982. CHI789–7/82/0000–0067. IEEE: 1982.
"Prospects for Electrolytic Hydrogen for Chemical/Industrial Plants." Leonard J. Nutall. General Electric Co. *Proceedings Frontiers of Power Technology*. Oklahoma State University: Oct. 9–10, 1974.
"Feasibility Study of a Regenerative Solid Polymer Electrolyte Fuel Cell System Using Hydrogen/Chlorine Reactants for High Efficiency Energy Storage." Nuttall et al. *Alternative Energy Sources*. Miami: 1978.
"An Assessment of the Solid Polymer Electrolyte Fuel Cell for Mobile Power Plants." J.F. McElroy. General Electric Co. *Proceedings of the 28th Power Sources Symposium*. Electrochemical Society, Inc. Jun. 1978.

(Continued)

*Primary Examiner*—Ngoclan T. Mai
(74) *Attorney, Agent, or Firm*—Cantor Colburn LLP

(57) ABSTRACT

An electrochemical cell capable of operating in pressure differentials exceeding about 2,000 psi, using a porous electrode. The porous electrode comprises a catalyst adsorbed on or in a porous support that is disposed in intimate contact and fluid communication with the electrolyte membrane.

13 Claims, 4 Drawing Sheets

OTHER PUBLICATIONS

"The Solid Polymer Electrolyte Fuel Cell for the Space Shuttle Orbiter." Lloyd E. Chapman. General Electric Co. *7th Intersociety Energy Conversion Engineering Conference 1972.* 729076. American Chemical Society.

"Abstracts of Papers." *First Chemical Congress of the North American Continent.* Mexico City, Nov. 30–Dec. 5, 1975. Baltimore, MD: Port City Press, Inc.

"Electrolytic Hydrogen Fuel Production with Solid Polymer Electrolyte Technology." Titterington et al. *8th Intersociety Energy Conversion Engineering Conference Proceedings.* University of Pennsylvania, Aug. 13–17, 1973. NY: American Institute of Aeronautics and Astronautics.

"Electrochemical Detection of $H_2$, CO, and Hydrocarbons in Inert or Oxygen Atmospheres." LaConti et al. *Journal of the Electrochemical Society,* vol. 118, No. 3. Washington: Electrochemical Society. Mar. 1971.

"The Current Status of Ion Exchange Membrane Fuel Cells." Niedrach et al. Technical Information Series, General Electic Company, Report No. 71–C–303. Schenectady, NY: Oct. 1971.

"A Low Pressure Electrolyzer for the Next Generation Submarine." Leonida et al. Hamilton Standard Division. SAE Technical Paper Series—921125. ISSN: 0148–7191. Society of Automotive Engineers, Inc. 1992.

"Application of Solid Polymer Electrolyte Water Electrolysis for Bulk Hydrogen Generation." L.J. Nuttall. *Proceedings of Eighth Synthetic Pipeline Gas Symposium.* American Gas Assoc. Cat. No. L51176. 1976.

"Conceptual Design of Large Scale Water Electrolysis Plant Using the Solid Polymer Electrolyte Technology. " L.J. Nuttall. *Conference Proceedings vol. 11—1st World Hydrogen Energy Conference.* Miami Beach: 1976.

Journal of the Electrochemical Cell Society, vol. 125, No. 3, Mar. 1978. pp. 74C–76C and 166C.

"Field Results and Continuing Development of SPE Electrolyzers." Lizdas et al. Hamilton Standard. *Informal Procedings—International Energy Agency Task IV Workshop Electrolytic Hydrogen Production.* DOE: 1973.

"Industrial and Government Applications of SPE Fuel Cell and Electrolyzers." Coker et al. General Electric Co. Case Western Symposium on *Membranes and Ionic and Electronic Conducting Polymer.* Cleveland: 1982.

"Solid Polymer Electrolyte Water Electrolysis Technology Development for Large–Scale Hydrogen Production. Final Report, Oct. 1977–Nov. 1981." NTIS: DE82010876. General Electric Co., 1981.

"SPE Water Electrolysis Subsystem, Configuration and Operations Manual." Hamilton Standard Division, Electro-Chem Products. United Technologies Coroporation: Jul. 1991.

"SPE® Hydrogen/Oxygen Fuel Cells for Rigorous Navel Applications." McElroy et al. Hamilton Standard. United Technologies Corporation. Windsor Locks, CT. pp. 1–5.

"Operations and Maintenance Manual for the Sirf—SPE® Oxygen Generator Assembly (OGA)." Hamilton Standard. United Technologies Corporation: Mar. 25, 1993.

International Search Report, International Application No. PCT/US03/25800, International Filing Date: Aug. 8, 2003, Date of Mailing: Jul. 5, 2004, 6 pages.

* cited by examiner

HIGH DIFFERENTIAL PRESSURE ELECTROCHEMICAL CELL

CROSS REFERENCE TO RELATED APPLICATIONS

This application is a divisional patent application of U.S. patent application Ser. No. 09/714,933, filed on Nov. 17, 2000, now Pat. No. 6,666,961, which claims the benefit of U.S. Provisional Application Ser. No. 60/166,135, filed on Nov. 18, 1999, and which is wholly incorporated herein by reference in its entirety.

TECHNICAL FIELD

The present invention relates to an electrochemical cell, and especially relates to an electrochemical cell capable of operating at high differential pressure.

BACKGROUND OF THE INVENTION

Electrochemical cells are energy conversion devices, usually classified as either electrolysis cells or fuel cells. A proton exchange membrane electrolysis cell functions as a hydrogen generator by electrolytically decomposing water to produce hydrogen and oxygen gases, and functions as a fuel cell by electrochemically reacting hydrogen with oxygen to generate electricity.

Referring to FIG. 1, a partial section of a typical fuel cell 10 is detailed. In fuel cell 10, hydrogen gas 12 and reactant water 14 are introduced to a hydrogen electrode (anode) 16, while oxygen gas 18 is introduced to an oxygen electrode (cathode) 20. The hydrogen gas 12 for fuel cell operation can originate from a pure hydrogen source, methanol or other hydrogen source. Hydrogen gas electrochemically reacts at anode 16 to produce hydrogen ions (protons) and electrons, wherein the electrons flow from anode 16 through an electrically connected external load 21, and the protons migrate through a membrane 22 to cathode 20. At cathode 20, the protons and electrons react with the oxygen gas to form resultant water 14', which additionally includes any reactant water 14 dragged through membrane 22 to cathode 20. The electrical potential across anode 16 and cathode 20 can be exploited to power an external load.

The same configuration as is depicted in FIG. 1 for a fuel cell is conventionally employed for electrolysis cells. In a typical anode feed water electrolysis cell (not shown), process water is fed into a cell on the side of the oxygen electrode (in an electrolysis cell, the anode) to form oxygen gas, electrons, and protons. The electrolytic reaction is facilitated by the positive terminal of a power source electrically connected to the anode and the negative terminal of the power source connected to a hydrogen electrode (in an electrolysis cell, the cathode). The oxygen gas and a portion of the process water exit the cell, while protons and water migrate across the proton exchange membrane to the cathode where hydrogen gas is formed. In a cathode feed electrolysis cell (not shown), process water is fed on the hydrogen electrode, and a portion of the water migrates from the cathode across the membrane to the anode where protons and oxygen gas are formed. A portion of the process water exits the cell at the cathode side without passing through the membrane. The protons migrate across the membrane to the cathode where hydrogen gas is formed.

In certain arrangements, the electrochemical cells can be employed to both convert electricity into hydrogen, and hydrogen back into electricity as needed. Such systems are commonly referred to as regenerative fuel cell systems.

The typical electrochemical cell includes a number of individual cells arranged in a stack, with the working fluid directed through the cells via input and out put conduits formed within the stack structure. The cells within the stack are sequentially arranged, each including a cathode, a proton exchange membrane, and an anode. The anode, cathode, or both are conventionally gas diffusion electrodes that facilitate gas diffusion to the membrane. Each cathode/membrane/anode assembly (hereinafter "membrane electrode assembly", or "MEA") is typically supported on both sides by support members such as screen packs or bipolar plates, forming flow fields. Since a differential pressure often exists in the cells, compression pads or other compression means are often employed to maintain uniform compression in the cell active area, i.e., the electrodes, thereby maintaining intimate contact between flow fields and cell electrodes over long time periods.

In addition to providing mechanical support for the MEA, flow fields such as screen packs and bipolar plates preferably facilitate fluid movement and membrane hydration. These porous support members can also serve as gas diffusion media to effectuate proper transport of the oxygen and hydrogen gas. Increasing the rates of transport and uniformity of distribution of the fluids (including liquid water and oxygen and hydrogen gases) throughout the electrochemical cells increases operating efficiencies.

With the support of the screen packs, conventional electrochemical cells can operate at a pressure differential of up to about 400 pounds per square inch (psi). While suitable for their intended purposes, such support members require additional manufacturing materials and steps, and may not be effective for cells operating at differential pressures greater than about 400 psi. In an electrolysis cell, for example, it is desirable to operate the cell at about 1,000 psi or greater. At pressures exceeding about 400 psi, and especially exceeding 600 psi, physical limitations of screen structures, i.e., the requirement of very small screen openings, hinders fluid transport therethrough, and thus limits their usefulness.

In order to enable operation at pressures up to about 2,000 psi, porous plate technology has disclosed in U.S. Pat. Nos. 5,296,109 and 5,372,689, issued to Carlson et at. in 1994. As shown in FIG. 2, a porous sheet 213 is disposed between the anode electrode 211 and the flow field (screen pack 203) to provide additional structural integrity to the membrane 209. According to Carlson, porous sheet 213 further enables dual-directional water and oxygen flow.

Porous plate have also been previously disclosed in a paper presented at The Case Western Symposium on "Membranes and Ionic and Electronic Conducting Polymer", Cleveland, Ohio May 17–19, 1982. Again as illustrated in FIG 2, this paper discloses that in order to prevent the membrane and electrode assembly from deforming into the flow fields, a porous, rigid support sheet 213 is inserted between the electrode 211 and the flow field distribution component 203. The particular arrangement described employs a porous titanium support sheet on the anode electrode, and a carbon fiber paper, porous, rigid support sheet on the cathode electrode (p. 14). At page 2, this paper claims that such cells were capable of operating at differential pressures ranging up to greater than 500 psi.

Use porous plates are also disclosed in "Solid Polymer Electrolyte Water Electrolysis Technology Development for Large-Scale Hydrogen Production", Final Report for the Period October 1977–November 1981 by General Electric Company, NTIS Order Number DE82010876, which is directed to solid polymer electrolyte water electrolysis technology. Certain electrolyzer arrangements using porous titanium plates are described, and as shown in FIG. 2 include an anode electrode 211, an anode electrode flow field of molded grooves 203, a cathode electrode 207, a cathode flow field of molded grooves 205, and ion exchange membrane 209 disposed between and in intimate contact with anode 211 and cathode 207. A porous sheet 213 is shown supporting ion exchange membrane 209 and interposed between anode flow field 203 and anode electrode 211. It is stated on page 10 of the report that earlier development had shown that a support for the membrane and electrode assembly was required on both the anode and cathode side to prevent creep of the membrane into flow areas. The anode support (porous sheet 213) comprised a thin, titanium foil with many small holes etched through for transport of water to the catalyst from the flow field and outflow of the oxygen gas. To provide improved water flow rates, these thin foil anode supports were reported to be replaced with porous titanium plates (p. 66).

A significant disadvantage of porous plate technology is the additional materials, manufacturing, and assembly expense that this element adds to the cell assembly. What is accordingly needed in the art is a cost effective electrochemical cell capable of operating at high pressures, e.g. exceeding about 1,000 psi.

SUMMARY OF INVENTION

The above-described drawbacks and disadvantages are alleviated by an electrochemical cell comprising a porous electrode, another electrode, and a membrane disposed between said electrodes; the method for using the electrochemical cell; the methods for making a porous electrode; and the method for producing electrical power.

The electrochemical cell comprises: a first, porous electrode, a second electrode, and a membrane disposed therebetween, wherein said first, porous electrode comprises a catalyst disposed in physical contact with an electrically conductive, porous support; a flow field in fluid communication with said second electrode; a first fluid port in fluid communication with said first electrode; and a second fluid port in fluid communication with said second electrode. The first, porous electrode accordingly comprises a porous catalytic structure which provides structural support for and integrity to the catalyst, reactive sites for the electrolysis of water to hydrogen and oxygen, a fluid flow field for the working gases and fluids, and support for the membrane.

One method for using the electrochemical cell comprises: introducing water to an oxygen electrode, wherein said oxygen electrode comprises a catalyst disposed in physical contact with an electrically conductive porous electrode; dissociating the water to form hydrogen ions, oxygen, and electrons; moving said electrons through an external load to a hydrogen electrode; migrating said hydrogen ions through a electrolyte membrane to the hydrogen electrode; and producing hydrogen gas at said hydrogen electrode.

One method for making the porous electrode comprises: sintering a layer of electrically conductive material to form a sintered, porous support; imbibing said sintered porous support with a solution of catalyst and solvent; and removing the solvent to form the porous electrode, wherein said porous electrode preferably has a porosity greater than about 20% by volume.

An alternative method for making the porous electrode comprises: coating an electrically conductive material with a solution of catalyst and solvent; forming a layer of said coated electrically conductive material; optionally removing the solvent from said layer; and sintering said layer to form the porous electrode, wherein said porous electrode preferably has a porosity greater than about 20% by volume.

Still another method for making the porous electrode comprises: coating an electrically conductive, porous support with a solution of catalyst precursor and solvent; and converting said catalyst precursor to a catalyst, wherein said porous electrode has a porosity preferably greater than about 20% by volume.

The method for producing electrical power comprises: producing first electricity; introducing at least a portion of said first electricity to an electrochemical cell having an oxygen electrode, a hydrogen electrode, an electrolyte membrane disposed therebetween, and an electrical load in electrical communication with said oxygen electrode and said hydrogen electrode, said oxygen electrode comprising a catalyst disposed in an electrically conductive porous flow field; introducing water to said oxygen electrode; dissociating the water to form hydrogen ions, electrons, and oxygen; migrating said hydrogen ions through said electrolyte membrane to said hydrogen electrode; moving said electrons through said electrical load to said hydrogen electrode; producing hydrogen gas at said hydrogen electrode; and using said hydrogen gas to produce additional electricity when said first electricity is not available or is insufficient.

The above discussed and other features and advantages of the present invention will be appreciated and understood by those skilled in the art from the following detailed description and drawings.

BRIEF DESCRIPTION OF DRAWINGS

Referring now to the drawings, which are meant to be exemplary and not limiting, and wherein like elements are numbered alike in the several Figures.

DETAILED DESCRIPTION

Figure 1:
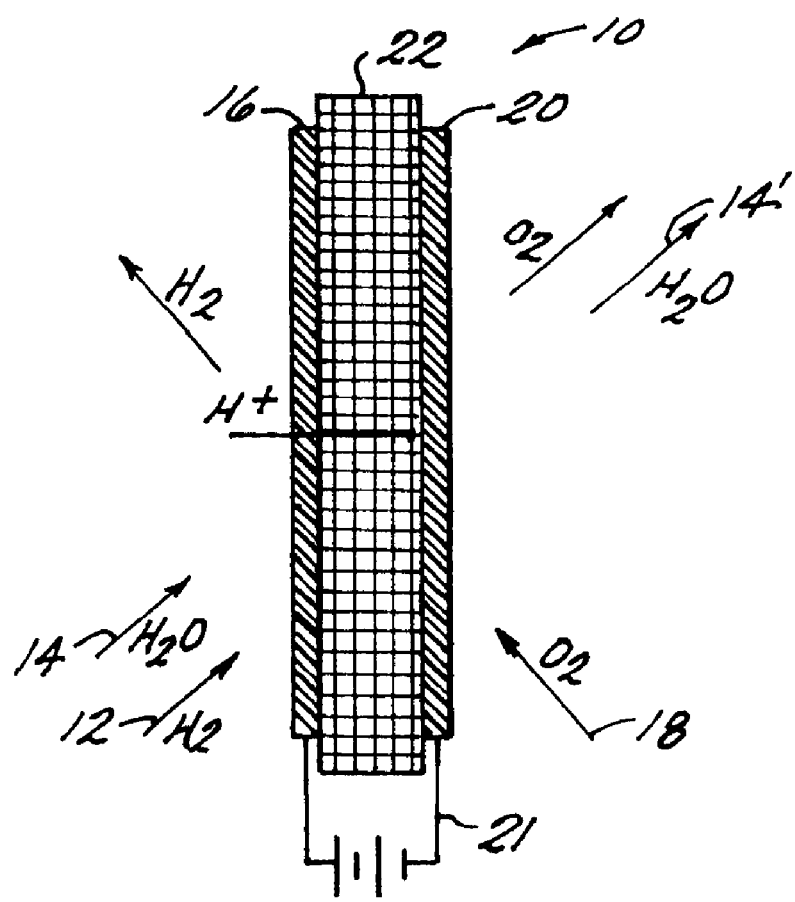
FIG. 1 is a schematic diagram of a prior art electrochemical cell showing a typical fuel cell reaction.
Figure 2:
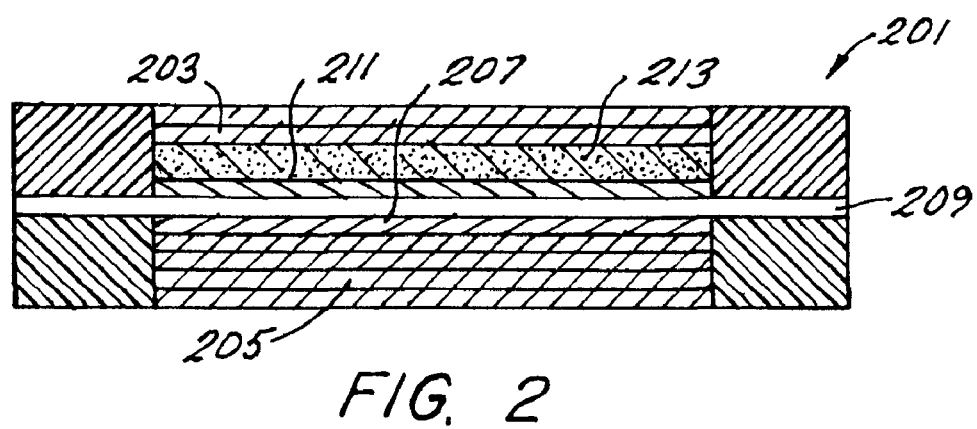
FIG. 2 is a cross-sectional view of a prior art electrochemical cell having a porous plate.

Although described in relation to a proton exchange membrane electrochemical cell employing hydrogen, oxygen, and water, it is readily understood that this invention can be employed with all types of electrochemical cells utilizing solid electrolytes, such as solid oxide, proton exchange membrane, and various reactants, including, but not limited to, hydrogen, bromine, chlorine, oxygen, iodine, fluorine, methanol, and other fluids. Upon the application of different reactants and/or a different electrochemical cell stack, the flows, reactions, and preferred materials (e.g. catalysts and type of membrane) are understood to change accordingly, as is commonly understood in relation to that particular type of electrochemical cell.

This electrochemical cell, cell stack, electrode, and a method for operating the same enables high pressure differential operation, i.e., operation at differential pressures exceeding about 1,000 psi, preferably exceeding about 2,000 psi, and most preferably up to or exceeding about 4,000 psi. The electrochemical cell stack is comprised of at least one, and preferably a plurality of electrochemical cells. Each cell comprises an anode electrode and cathode electrode with an electrolyte membrane disposed therebetween, and fluid flow fields in fluid communication with the electrodes. At least one of the electrodes, preferably the oxygen electrode (anode) in an electrolysis cell, comprises a porous catalytic structure which provides structural support for and integrity to the catalyst, reactive sites for the electrolysis of water to hydrogen and oxygen, and a fluid flow field for, e.g., the water and oxygen.

The electrolyte membrane for both electrolysis and fuel cells can be of any material typically employed for forming the membrane in electrochemical cells. The electrolytes are preferably solids or gels under the operating conditions of the electrochemical cell. Useful materials include proton conducting ionomers and ion exchange resins. Useful proton conducting ionomers can be complexes of an alkali metal, alkali earth metal salt, or a protonic acid with one or more polar polymers such as a polyether, polyester, or polyimide, or complexes of an alkali metal, alkali earth metal salt, or a protonic acid with a network or crosslinked polymer containing the above polar polymer as a segment. Useful polyethers include polyoxyalkylenes, such as polyethylene glycol, polyethylene glycol monoether, polyethylene glycol diether, polypropylene glycol, polypropylene glycol monoether, and polypropylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; esters, such as phosphoric acid esters, aliphatic carboxylic acid esters or aromatic carboxylic acid esters of the above polyoxyalkylenes. Copolymers of, e.g., polyethylene glycol with dialkylsiloxanes, polyethylene glycol with maleic anhydride, or polyethylene glycol monoethyl ether with methacrylic acid are known in the art to exhibit sufficient ionic conductivity to be useful. Useful complex-forming reagents can include alkali metal salts, alkali metal earth salts, and protonic acids and protonic acid salts. Counterions useful in the above salts can be halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, tetrafluoroethylene sulfonic acid, hexafluorobutane sulfonic acid, and the like.

Ion-exchange resins useful as proton conducting materials include hydrocarbon-and fluorocarbon-type resins. Hydrocarbon-type ion-exchange resins can include phenolic or sulfonic acid-type resins; condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of a tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is the NAFION® resins available from E. I. DuPont de Nemours Inc., Wilmington, Del.

The membrane is disposed adjacent to and in fluid communication with the porous electrode, which comprises a catalyst adsorbed on, and preferably throughout a porous support. Possible catalysts include electrode catalysts conventionally utilized in electrochemical cell systems, such as platinum, palladium, rhodium, iridium, ruthenium, osmium, carbon, gold, tantalum, tin, indium, nickel, tungsten, manganese, and the like, as well as mixtures, oxides, alloys, and combinations comprising at least one of the foregoing catalysts. Additional possible catalysts, which can be used alone or in combination with the above, include graphite and organometallics, such as pthalocyanines and porphyrins, and combinations comprising at least one of the foregoing catalysts, and the like. Suitable catalysts are also disclosed in U.S. Pat. Nos. 3,992,271, 4,039,409, 4,209,591, 4,272,352, 4,707,229, and 4,457,824, which are incorporated herein by reference in their entirety.

The catalyst can be in the form of discrete catalyst particles, and may further comprise hydrated ionomer solids, fluorocarbons, other binder materials, other materials conventionally utilized with electrochemical cell catalysts, and combinations comprising at least one of the foregoing catalysts. The ionomer solids can be any swollen (i.e., partially disassociated polymeric material) proton and water conducting material. Possible ionomer solids include those having a hydrocarbon backbone, and perfluoroionomers, such as perfluorosulfonate ionomers (which have a fluorocarbon backbone). Ionomer solids and catalysts therewith are further described in U.S. Pat. No. 5,470,448 to Molter et al., which is incorporated herein by reference in its entirety.

The catalyst is adsorbed on and/or within a porous support as further described below. The porous support can comprise any electrically conductive material compatible with the electrochemical cell environment (for example, the desired pressure differential, preferably up to or exceeding about 4,000 psi, temperatures up to about 250° C., and exposure to hydrogen, oxygen, and water). Some possible materials include carbon, nickel and nickel alloys (e.g., Hastelloy®, which is commercially available from Haynes International, Kokomo, Ind., Inconel®, which is commercially available from INCO Alloys International Inc., Huntington, W. Va., among others), cobalt and cobalt alloys (e.g., MP35N®, which is commercially available from Maryland Specialty Wire, Inc., Rye, N.Y., Haynes 25, which is commercially available from Haynes International, Elgiloy®, which is commercially available from Elgiloy® Limited Partnership, Elgin, Ill., among others), titanium, zirconium, niobium, tungsten, carbon, hafnium, iron and iron alloys (e.g., steels such as stainless steel and the like), among others, and oxides, mixtures, and alloys comprising at least one of the foregoing materials. The particular form of the porous support, e.g., fibrous (random, woven, non-woven, chopped, continuous, and the like), granular, particulate powder, preform, and the like are discussed in more detail below in connection with manufacture of the porous electrode.

A number of methods may be used in the manufacture of the porous electrode. For example, particulate materials of any geometry can be infiltrated with the desired catalyst, e.g., in the form of an ink, via painting, spraying, dipping, imbibing, vapor depositing, or the like. The infiltrated particles are then compacted using pressure, and then vacuum sintered (e.g., co-sintered) to form the porous electrode. The particles before compaction may be either solid or porous.

Alternatively, porous support, e.g., in the form of a fibrous felt, woven or unwoven screen, a porous layer, or a combination comprising at least one of the foregoing forms, or the like, is infiltrated with the catalyst. Once the catalyst has been adsorbed onto at least some surfaces of the porous support, any solvent is removed, leaving behind the catalyst material. As used herein "adsorbed" is intended to encompass any adsorption onto a surface of the porous support (whether the surface is exterior or interior), as well as absorption within the material comprising the porous support, as may occur with certain conductive polymers, for example. The fibers or other forms may themselves be solid or porous. Suitable porosities for the porous support are generally greater than about 10%, preferably greater than about 20%, and most preferably about 40 to about 90% by volume.

Still another method for making the porous electrode comprises coating an electrically conductive, porous support with a solution of catalyst precursor and solvent; and converting said catalyst precursor to a catalyst.

In another embodiment, particulate or fibrous materials of virtually any geometry are used to make a preform. This method accordingly comprises sintering a layer of electrically conductive material to form a sintered, porous support; infiltrating the sintered porous support with a solution of catalyst and solvent; and removing the solvent to form the porous electrode. Suitable porosities for the porous support are generally greater than about 10%, preferably greater than about 20%, and most preferably about 40 to about 90% by volume.

The porous electrode should have a porosity and pore size effective to enable migration of the appropriate fluid therethrough and dual directional fluid flow. Such porosities are readily determined by one of ordinary skill in the art, depending on the fluids, gases, pressures, and the like. Suitable porosities for the porous electrode are generally greater than about 20%, preferably greater than about 40%, more preferably about 20% to about 80%, and most preferably about 40% to about 70% by volume. Typically a mean pore size of up to or exceeding about 20 microns can be used, with up to about 15 microns preferred, and about 2 to about 13 microns especially preferred.

Due to the three dimensional nature of the porous support, the electrode can have a lower catalyst loading than conventional electrodes with a substantially similar reactivity. For example, although catalyst loadings exceeding about 10 milligrams per square centimeter (mg/cm2) can be used, loadings of less than about 2 mg/cm2 are preferred, with loadings of about 0.01 mg/cm2 to about 1 mg/cm2 especially preferred. In contrast, to obtain a similar reactivity, typical prior art electrodes required a catalyst loading of about 5 mg/cm2 or greater.

The size and geometry of the porous electrode are dependent upon the specific operating condition and application. For example, if the porous electrode will replace the electrode and screen pack of a conventional cell, the thickness of the porous electrode will be greater than in a system which will also employ a screen pack. The porous electrode thickness is based upon whether a bipolar plate is employed, whether a screen pack is employed, the opening size in the screen pack, pressure applied across the membrane, operating conditions, material composition and form (e.g., fiber (random, woven, non-woven, chopped, continuous, and the like), granular, particle, preform, powder, combination comprising at least one of the foregoing forms, and others), and porosity and strength of the porous electrode. Typically, for pressures up to about 2,000 psi, a sintered particulate electrode and using a 3/0 screen support, the porous electrode can have a thickness of up to about 40 mil or more, with about 5 to about 20 mils more preferred, and about 8 to about 12 mils especially preferred.

The second electrode can be a conventional electrode, e.g. a catalyst layer disposed in intimate contact with the membrane, or can be a second supported porous electrode as described above. The general composition of the catalyst is preferably the same as described above in relation to the porous electrode catalyst, wherein the catalysts employed on each side of the membrane can be of substantially the same composition or different compositions.

The flow fields of the electrochemical cell can comprise screen packs, can be formed by the porous electrode, bipolar plates with grooves or other flow features formed therein, or other type of support structure. Suitable screen packs comprise electrically conductive material, such as woven metal, expanded metal, perforated or porous plates, fabrics (woven and non-woven), ceramic (e.g., particulate filled ceramic), polymers or other material, or a combination thereof, which provide structural integrity to the membrane assembly while forming an appropriate flow field for the various fluids and establishing an electron transport to and from the electrodes. Typically the screen packs are composed of material such as niobium, zirconium, tantalum, titanium, steels such as stainless steel, nickel, and cobalt, among others, as well as mixtures, oxides, and alloys comprising at least one of the foregoing materials. The geometry of the openings in the screens can range from ovals, circles and hexagons to diamonds and other elongated and multi-sided shapes. The particular porous conductive material employed is dependent upon the particular operating conditions on that side of the membrane assembly. Examples of suitable screen packs are disclosed in commonly assigned U.S. application Ser. No. 09/464,143, which is incorporated herein by reference in its entirety.

In order to attain the desired pressures, in the electrochemical cells, it is preferable to at least dispose a porous electrode on the lower pressure side of the membrane in conjunction with a screen pack. Although the porous electrode forms a suitable flow field and provides sufficient structural integrity to the membrane up to pressures of about 2,500 psi, screen packs can provide high flow throughput to enhance removal of process heat.

In order to allow transport of the electrons, the electrodes electrically connect to an electrical load and/or power source. The electrical connection can comprise any conventional electrical connector such as wires, a truss/buss rod, buss bars, combinations comprising at least one of the foregoing connectors, or another electrical connector.

The hydrogen produced hereby can be stored as high-pressure gas, or alternatively, in a solid form, such as a metal hydride, a carbon based storage (e.g. particulates, nanofibers, nanotubes, or the like), or others and combinations comprising at least one of the foregoing solid storage forms.

Figure 3:
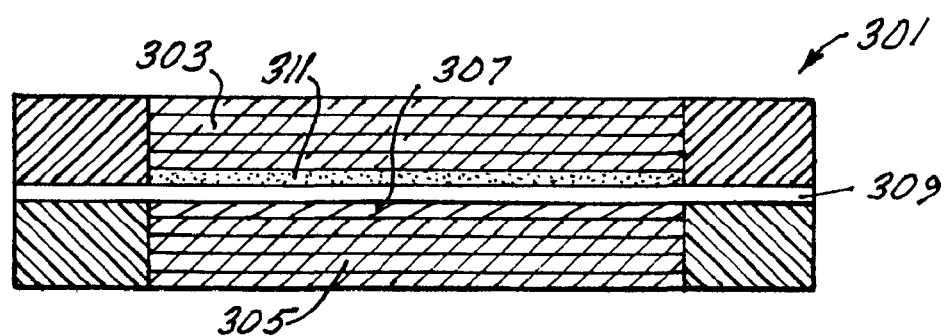
FIG. 3 is a cross-sectional view of one embodiment of the electrochemical cell of the present invention.

FIG. 3 illustrates one embodiment of the electrochemical cell 301. In this embodiment, porous electrode 311 is disposed between and in both fluid and electrical communication with hydrogen flow field 303 and membrane 309. On the opposite side of membrane 309 is the oxygen electrode 307 disposed between and in both fluid and electrical communication with the membrane 309 and the oxygen flow field 305.

In an alternative embodiment, the porous electrode could form the oxygen flow field and be disposed in fluid and electrical communication with the membrane. Meanwhile, the hydrogen electrode would be in electrical and fluid communication with the hydrogen flow field and the opposite side of the membrane.

The porous electrode can be employed on either or both sides of the electrolyte, alone or in combination with a flow field, with various other conventional electrochemical cell stack components being optional based upon the particular design chosen. Some possible optional components comprise protector lip(s), gasket(s), separator plate(s), pressure pad(s), spring washer(s), and the like.

The following examples are provided for the purpose of illustration and do not limit the invention.

EXAMPLE 1

A porous oxygen electrode was formed by treating a 0.010 inch thick sintered titanium plate having approximately 50% porosity with a catalyst ink and binder comprising 3.7 weight percent (wt %) of an oxygen catalyst (as disclosed in expired U.S. Pat. No. 3,992,271, 50% Pt-50% Ir), 12.1 wt % of 5 wt % solution NafionÒ, and 84.2 wt % deionized water. The porous plate was soaked in acetone then placed in the boiling ink solution at 100° C. The acetone was vaporized in the solution while the catalyst and binder remained and imbibed into the porous titanium creating a porous electrode. The porous electrode was then heated to 180° C. in an oven to activate the catalyst binder, thereby adsorbing the catalyst to walls of the pores in the interior porous electrode. This process was repeated until a catalyst loading of 0.8 mg/cm2 was achieved.

The electrode prepared in accordance with the above example was tested in an electrolysis cell stack loaded with a force of 63,200 lbs on an overall cell area of 31.6 in2 and configured in the following order: separator plate, screen pack (in accordance with U.S. application Ser. No. 09/464, 143, the porous electrode, a NafionÒ membrane (having a conventional catalyst disposed on the opposite side), a second screen pack (in accordance with U.S. application Ser. No. 09/464,143, a shim, a pressure pad (in accordance with U.S. patent application Ser. No. 09/413,782, and another separator plate. A stainless steel ring was fitted around the cell frames to provide lateral strength for high-pressure operation. This cell was hydrostatically tested to 2,500 pounds per square inch gauge (psig) without overboard or crossover cell leakage.

Figure 4:
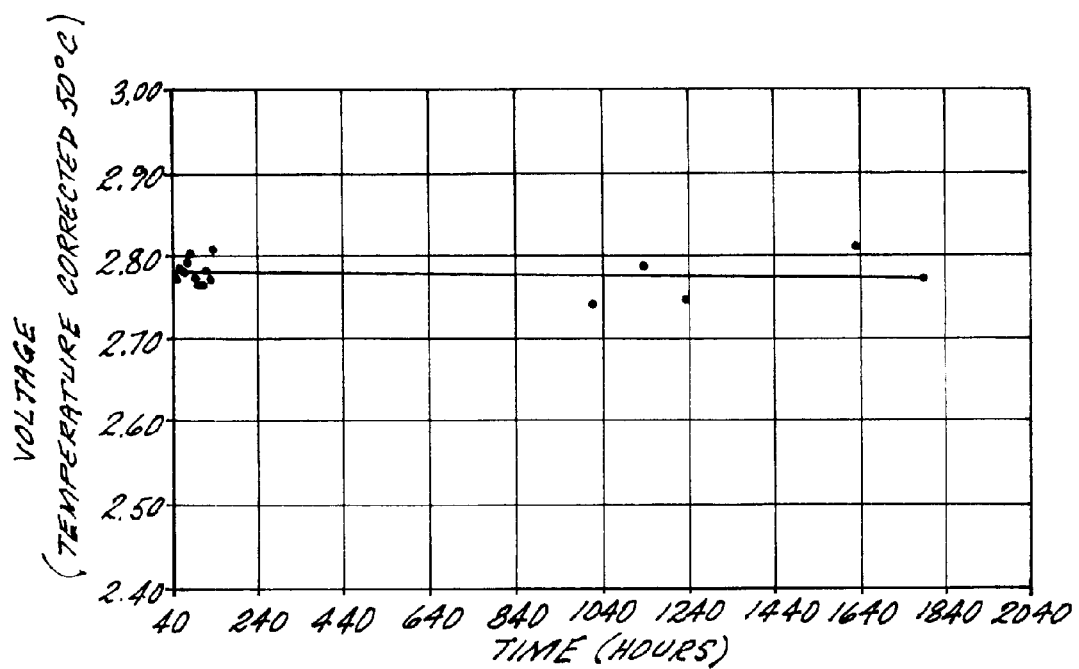
FIG. 4 is a graph of voltage measured over time of an electrolysis cell stack of the present invention.

Operational testing was conducted using the above-described configuration at 2000 psi hydrogen, essentially atmospheric oxygen pressure, a temperature corrected to 50° C. (variation over the course of testing was +10° C.), a a current density of 1000 Amps/cm2. The water was passed on the oxygen side of the cell. As the data shown in FIG. 4 illustrates, the cell shows a voltage degradation of less than 1 microvolt per cell hour, indicating that the inventive porous electrode structure is providing a combination of effective oxygen and water flow, as well as support.

EXAMPLE 2

A porous oxygen electrode was formed by dipping a 0.03 square foot (27.87 cm2) porous titanium plate into 20 mL of an aqueous 6 M HCl solution comprising 1 gram of iridium trichloride and 1 gram of hexachloroplatinic acid that had been stirred for at least one hour. After dipping, the coated plate was dried for about 20 minutes in an oven (151° F., 61° C.). The dipping/drying cycle was performed five times, then the dried, coated plate was heated to 500° C. for about 30 minutes, to convert the chloride to the corresponding metal oxide(s).

The metal oxides are then reduced to the metal by chemical (e.g., boron hydride) or other means. Thus, the heated plate was then immersed in a 3 M aqueous solution of sulfuric acid and connected to a the negative terminal of a power supply, making it the cathode, and a platinized titanium counterelectrode was connected to the positive terminal of the power supply, making it the anode. The current was maintained at 2 volts for about 15 minutes, and then at 5 volts for about 15, resulting in the reduction of the metal oxides to the corresponding metals. At 1.5 volts, hydrogen appeared to evolve at the porous electrode (cathode).

The electrochemical cells and method of use thereof employing the above-described electrodes have a number of advantageous features. For example, because hydrogen can be stored at high pressures (e.g., greater than about 400 psi), the electrode and the electrochemical cell stack can be particularly useful in numerous applications such as to power a vehicle, as a supplemental power source, or to convert intermittent power into steady power. When powering a vehicle, the electrochemical cell can be in fluid and/or electrical communication with the vehicle, e.g., with an internal combustion engine, a fuel cell, and/or can operate as a regenerative fuel cell. For example, an electrolysis cell stack can produce hydrogen, which is stored, supplied to a vehicle, and then used in the vehicle to produce motive power.

Intermittent power can be supplied in numerous manners: photovoltaic cells, intermittent due to night (non-solar) exposure; wind devices (e.g., windmills) intermittent when wind speed is low or substantially non-existent; hydroelectric power (e.g., water, typically dammed, directed through turbines), intermittent during drought conditions; grid power, intermittent during power outages (e.g., lines are down due to a storm); combinations thereof, and the like. The electrochemical cell stack can be incorporated into a grid with one or more of the power sources to produce and store hydrogen while these intermittent power sources provide electricity. When the intermittent power sources are not available or additional electrical power is desired (e.g., during peak usage times), the stored hydrogen can be used to produce electricity.

The electrochemical cell employs at least one porous electrode which enables high pressure differential operation, e.g., pressures up to and exceeding about 2,000 psi, with pressures up to about 6,000 psi preferred, and pressures up to and exceeding 10,000 psi possible. Such high-pressure operation enables the direct filling of high-pressure hydrogen and/or oxygen tanks (cylinders or the like), without the use of additional equipment such as compressors and the like. This efficient, effective utilization of an electrochemical cell renders this technology particularly useful in areas requiring high pressure output with reduced size, e.g. automotive industry, remote location fuel and/or electricity generation (such as undeveloped, inaccessible locations), and the like. For example, an electrochemical cell having at least one porous electrode could be employed in or with a vehicle to recharge the vehicle with hydrogen to use in producing electricity for motive power.

A further advantage is the improved efficiency of the catalyst. In prior art electrodes, the electrode was very thin (typically about less than about 0.1 mils) and relatively impermeable to the reactant. Consequently, reactions substantially only occurred on the electrode surface. As a result, there was a limited reaction zone and a large percentage of the catalyst (i.e., the sub-surface catalyst) remained unused. In contrast, the porous electrode is three-dimensional and reactant permeable. Consequently, the catalyst has access to substantially all of the catalyst. Due to the high efficiency of this three-dimensional structure, the catalyst loading necessary to attain substantially similar catalyst activity as the prior art is substantially reduced, e.g., by about 3 orders of magnitude (e.g., about 10 mg/cm2, conventionally, to as low as about 0.01 mg/cm2 with the porous electrode). Due to the structural integrity provided by this porous electrode, it can be used alone or in conjunction with an additional fluid flow field(s) (e.g., one or more screen packs or plates having flow channel features).

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for making a porous electrode, comprising:
    sintering a layer of electrically conductive material to form a sintered porous support having a porosity of greater than about 10%, wherein said electrically conductive material is cobalt, zirconium, hafnium, niobium, tungsten, carbon, or mixtures or alloys thereof; and
    infiltrating said sintered porous support with a catalyst.

2. A method for making a porous electrode as in claim 1, wherein the porous electrode has a mean pore size of about 2 to about 13 microns.

3. A method for making a porous electrode as in claim 1, wherein said sintered porous support has a porosity greater than about 40%.

4. A method for making a porous electrode, comprising:
    coating an electrically conductive material with a catalyst, wherein said electrically conductive material is cobalt, zirconium, hafnium, niobium, tungsten, carbon, iron, or mixtures or alloys thereof;
    forming a layer of said coated material; and
    sintering said layer to form the porous electrode, wherein said porous electrode has a porosity greater than about 20%.

5. A method for making a porous electrode as in claim 4, wherein said porous electrode has a porosity greater than about 40%.

6. A method for making a porous electrode, comprising:
    coating an electrically conductive material with a catalyst;
    forming a layer of said coated material; and
    sintering said layer to form the porous electrode, wherein said porous electrode has a porosity greater than about 20%; and
    wherein said porous electrode has a mean pore size of about 2 to about 13 microns.

7. A method for making a porous electrode, comprising
    coating an electrically conductive, porous support with a solution of catalyst precursor; and
    converting said catalyst precursor to a catalyst;
    wherein said pourous support comprises an electrically conductive material, and wherein said material is cobalt, zirconium, hafnium, niobium, tungsten, carbon, iron, or mixtures or alloys thereof.

8. A method for making a porous electrode as in claim 7, wherein the electrode has a porosity greater than about 20% by volume.

9. A method for making a porous electrode as in claim 7, wherein the porous electrode has a mean pore size of about 2 to about 13 microns.

10. A method for making a porous electrode as in claim 7, wherein said sintered porous support has a porosity greater than about 40% by volume.

11. A method for making a porous electrode as in claim 6, wherein said material is nickel, cobalt, titanium, zirconium, hafnium, niobium, tungsten, carbon, iron, or mixtures or alloys thereof.

12. A method for making a porous electrode as in claim 11, wherein said electrically conductive material is cobalt, zirconium, hafnium, niobium, tungsten, carbon, or mixtures or alloys thereof.

13. A method for making a porous electrode as in claim 11, wherein said material is nickel, titanium, iron, or mixtures or alloys thereof.

* * * * *